United States Patent [19]

Seko et al.

[11] 4,118,457
[45] Oct. 3, 1978

[54] REDOX URANIUM ISOTOPE SEPARATION USING ANION EXCHANGERS

[75] Inventors: Maomi Seko; Tetsuya Miyake, both of Tokyo; Kunihiko Takeda, Yokohama; Akihiko Ikeda, Yokohama; Kazuo Imamura, Yokohama, all of Japan

[73] Assignee: Asahi Kasei Kogyo Kabushiki Kaisha, Osaka, Japan

[21] Appl. No.: 687,844

[22] Filed: May 19, 1976

[30] Foreign Application Priority Data

Jun. 3, 1975 [JP] Japan ................... 50-66884

[51] Int. Cl.$^2$ ............................................. B01D 59/30
[52] U.S. Cl. ........................................... 423/7; 423/6
[58] Field of Search ........................................ 423/7, 6

[56] References Cited

U.S. PATENT DOCUMENTS

| 3,869,536 | 3/1975 | James ..................................... 423/7 |
| 3,953,569 | 4/1976 | Seko et al. ............................. 423/7 |
| 3,998,924 | 12/1976 | Jones ..................................... 423/7 |

Primary Examiner—Edward A. Miller
Attorney, Agent, or Firm—Burgess, Dinklage & Sprung

[57] ABSTRACT

An anion exchange resin particle provided with specific structure as well as specific functional groups is found to be suitable for uranium technology, especially for separation of uranium isotopes.

9 Claims, No Drawings

REDOX URANIUM ISOTOPE SEPARATION USING ANION EXCHANGERS

This invention relates to a novel anion exchange resin particle which is particularly suitable for uranium technology and to a process for separation of uranium isotopes by use of said novel anion exchange resin particle.

Various attempts have hitherto been made for chemically treating uranium solutions with anion exchangers in the uranium industry. Typical fields are (1) recovery of uranyl ion with anion exchanger in uranium refining industry and (2) separation of uranium isotopes with anion exchanger. Known techniques of uranium recovery are described in "Technology of Uranium" written by N. P. Galkin et al, published by Israel Program for Scientific Translation in 1966, Chapter 6. A process for separation of uranium isotopes with anion exchanger is disclosed in German Patent OLS No. 2349595. These technologies are very important because chemical treatment of uranium can be achieved advantageously in the uranium industry. But, these technologies have not fully recognized an important role of anion exchangers used therein. Namely, in these technologies, there have been generally used conventional anion exchangers, which are commercially available or can easily be prepared, without special considerations as to various properties of anion exchangers.

An object of the present invention is to provide a novel anion exchange particle having excellent characteristics suitable for uranium technology, especially for separation of uranium isotopes.

Another object is to provide a process for separation of uranium isotopes by use of said anion exchange resin particle.

Further objects will be apparent in the descriptions detailed below.

The anion exchange resin particle provided by the invention is a granular resin with a size of 1 mm or less comprising a three-dimensionally crosslinked polymer containing functional groups having anion exchange capacity of 0.2 milliequivalents or more per gram of dry resin and having a mass transfer coefficient of uranyl ion which is at least $1 \times 10^{-7}$ cm$^2$/sec as measured by the method as hereinafter described.

It is now discovered that a high self-diffusion coefficient of uranyl ion is most important for highly efficient operation of uranium technology. Uranium ion coordinates with several ligands negatively charged and exists as complex ion in solution when uranium ion is adsorbed on anion exchangers. Therefore, the radius of the complex ion is considerably larger than a uranium ion which is not coordinated with ligands. Hexavalent uranium ion usually exists as uranyl ion $UO_2^{2+}$ and therefore uranyl ion should be coordinated with at least three monodentate ligands to be negatively charged and adsorbed on an anion exchanger. For this reason, the velocity of ion exchange is unexpectedly low and efficiency of recovery or separation is thereby made remarkably low. In accordance with the present invention, a high velocity of ion exchange is found to be effected by use of a resin having a large self-diffusion coefficient of uranyl ion. It is therefore critical in the present invention that the anion exchange resin particle should have a self-diffusion coefficient of uranyl ion (hereinafter referred to as "D") which is not less than $1 \times 10^{-7}$ cm$^2$/sec, preferably $1 \times 10^{-6}$ cm$^2$/sec or more.

It is also discovered that the anion exchanger should have a suitable adsorptive power for uranium (IV), uranium (VI), oxidizing agent and reducing agent so as to form the adsorbed region of uranium and the regions of oxidizing agent and reducing agent. Namely, uranyl ion should be adsorbed more preferably than uranous ion, oxidizing agent should be adsorbed more preferably than uranous ion, and the adsorption power for reducing agent should be weaker than for any other species. Furthermore, for efficient separation of uranium isotopes, the anion exchanger is also required to have sufficient physical strength as well as chemical resistance so that it may not suffer from damages caused by oxidizing agent or contamination by organic compounds.

In order for the anion exchange resin of the invention to have D in the range as specified above and other required performances, it should contain micro-voids which may either be discrete or connected to each other. When the micro-voids are discrete, their sizes are found to be suitably within the range from 40 to 9,000 angstroms, preferably from 60 to 3,000 angstroms, in diameter. As the result of further analysis, D is intimately correlated with other parameters such as $W_A$, which is the ratio of void volume of discrete micro-voids divided by the tenth root of their size, and $V_B$, which is the ratio of whole void volume in the resin multiplied by the fifth root of percentage of volume change of the resin when equilibrated with 2N HCl at 60° C. For obtaining favorable results, $W_A$ is required to be in the range from 0.2 to 1, preferably from 0.4 to 0.9, and $V_B$ in the range from 0.2 to 3, preferably from 0.4 to 2.

As anion exchange groups, such groups as primary, secondary or tertiary amino group, or quaternary ammonium group may be included. However, it has also been found that a resin which has tertiary amino groups can make the efficiency of uranium separation higher.

The tertiary amino groups suitably used in the present invention can be classified into various types:

(1) dialkylaminobenzyl groups such as dimethylaminobenzyl, methyl ethyl aminobenzyl, diethyl aminobenzyl and butyl propyl aminobenzyl;

(2) dialkanol aminobenzyl groups such as diethanol aminobenzyl, dipropanol aminobenzyl and ethanol butanol aminobenzyl;

(3) alkyl alkanol aminobenzyl groups such as methyl ethanol aminobenzyl, ethyl ethanol aminobenzyl and butyl propanol aminobenzyl;

(4) tertiary amino groups obtained by polymerization of acrylamide or derivatives thereof such as N-(dimethyl aminomethyl) acrylamide, N-(diethyl aminomethyl) acrylamide and N-(dialkyl aminomethyl) acrylamide;

(5) dialkyl-, dialkanol- or alkylalkanol- aminobenzene groups such as diethanol aminobenzene, diethanol aminobenzene and methyl ethanol aminobenzene;

(6) tertiary amino groups directly bonded to the backbone of the polymer as prepared by alkylation of primary amino groups with formic acid and formalin or halogenated hydrocarbon, by polymerization of monomers such as vinyl amide, N-vinyl urea, N-vinyl carbamate and vinyl imide (e.g. N-vinyl phthalimide, N-vinyl succimide, N-vinyl tetrahydrophthalimide, etc.) or by reaction of nitro groups in the polymer with carbondioxide, sulfonic acid or halogen atoms;

(7) pyridine and alkyl pyridine groups as prepared by polymerization of 2-vinyl pyridine, 4-vinyl pyridine, 2-methyl-5-vinyl pyridine, divinyl pyridine, etc.;

(8) N-vinyl heterocyclic groups as prepared by polymerization of N-vinyl indole, N-vinyl benzimidazole, N-vinyl triazole and vinyl triazole;

(9) dialkylamino, dialkanolamino or alkylalkanolamino groups as prepared from various acrylates and methacrylates such as dimethyl aminoethylmethacrylate, dimethyl aminoethylacrylate, methyl ethanolaminoethylmethacrylate, diethanolaminoethylacrylate and dimethyl aminohexylmethacrylate;

(10) tertiary amino groups as prepared from diallyl amine, amino butadiene, etc.; and

(11) tertiary amino groups formed by condensation polymerization of amines such as ethylenediamine, hexamethylenediamine, polyethylene imine and polyaminotriazole with polyfunctional compounds such as epichlorohydrin, dichloroethane, dibromoethane, dibromopropane, p-(chloromethyl)-benzene, glyoxal and epoxy compounds.

The anion exchange groups should be contained in amounts enough to impart at least 0.2 meq/g-dry resin of exchange capacity to the resin particle obtained.

Anion exchange groups can be introduced into a crosslinked polymer substrate by various methods such as chloromethylation and amination, or nitration and amination, etc. Alternatively, by direct polymerization of monomers having anion exchange groups, crosslinked polymer particles containing anion exchange groups can be produced.

The crosslinked polymers can be prepared by either addition or condensation polymerization.

The monomers which may be used in addition polymerization include styrene, methylstyrene, ethylstyrene, dimethylstyrene, vinylnaphthalene, butadiene, isoprene, chlorostyrene, methoxystyrene, cyanostyrene, fluorostyrene, N,N-dimethylaminostyrene, chloromethylstyrene, trifluorostyrene, trifluoromethylstyrene, aminostyrene; acrylonitrile or its derivatives such as methacrylonitrile, acrylic and methacrylic acids, and esters thereof such as methyl acrylate, ethyl acrylate, chloromethyl acrylate, ethylacetoxy acrylate, dimethylaminoethyl methacrylate, glycidyl methacrylate, methyl methacrylate, tetrahydrofurfuryl methacrylate, hydroxyethyl methacrylate; vinyl ketone and its derivatives such as ethylisopropyl ketone; vinylidene compounds such as vinylidene chloride, acrylamide and its derivatives such as methacrylamide, N-butoxymethyl acrylamide, N-phenylacrylamide, diacetone acrylamide, N,N-dimethylaminoethyl acrylamide; epoxybutadiene, epoxystyrene, N-vinylsuccinimide, N-vinylpyrrolidone, N-vinylphthalimide, N-vinylcarbazole, vinyl furan, 2-vinyl benzofuran, vinyl thiophene, vinyl imidazole, methyl vinyl imidazole, vinyl pyrazole, vinyl thiazole, vinyl tetrazole, 2-vinyl pyridine, 4-vinyl pyridine, 2-methyl-5-vinyl pyridine, 2,4-dimethyl-6-vinyl triazine, vinyl quinoline, and others.

Crosslinking agents used in addition polymerization are divinylbenzene, divinyltoluene, divinylethylbenzene, trivinylbenzene, divinyldiphenyl, divinyldiphenylsulfide, divinylsulfone, divinylketone, divinylpyridine, divinyl quinoline, bis-(vinylpyridine ethyl) ethylene diamine, diallylphthalate, diallylamine, triallylamine, triallylisocyanurate, diallylmaleate, N,N-ethylenediacrylamide, N,N-methylenediacrylamide, ethyleneglycol dimethacrylate, trimethylolpropane trimethacrylate.

The monomers used in condensation polymerization are amines such as ethylenediamine, ethyleneimine, hexamethylenediamine, polyethyleneimine, polyvinylamine, polyaminostyrene, polyvinylpyridine, polymethylvinyl imidazole and their derivatives, etc. The crosslinking agents used in condensation polymerization are dibromoethane, bis(chloromethyl) benzene, epichlorohydrin, diepoxy compounds, glyoxal and other dialdehyde compounds.

Preferable anion exchange particles comprise such products as set forth below:

(a) chloromethylated and aminated product of a crosslinked polymer made by addition polymerization of styrene, vinyl toluene and/or ethylvinyl benzene with divinyl benzene;

(b) aminated product of a crosslinked polymer made by addition polymerization of chloromethyl styrene, methylvinyl ketone, epoxybutadiene, acrylamide, etc. with divinyl benzene or triallylcyanurate;

(c) a crosslinked polymer made by copolymerization of N-vinylsuccinimide, N-vinyl phthalimide, vinyl carbazole, vinyl imidazole, vinyl pyridine, vinyl tetrazole, vinyl quinoline, divinyl pyridine, etc. with crosslinking monomers such as divinyl benzene; and (d) a crosslinked polycondensate made by condensation of amines such as polyethyleneimine, hexamethylenediamine, etc. with polyfunctional compounds such as dichloroethane or epichlorohydrin.

For preparation of the anion exchange resin particles as mentioned above, various methods can be used. In general, monomers are copolymerized with crosslinking agents in the form of minute droplets in the presence of an agent for formation of micro-voids, namely a diluent, followed by removal of said diluent after completion of the copolymerization. In case when no anion exchange group is contained in the starting monomers, the copolymerized product is further subjected to treatments for introduction of anion exchange groups into the base polymer. Typically, chloromethylation and amination, or nitration and amination can be mentioned as such treatments. One of the preferable methods for preparation of the crosslinked polymer particle is a suspension polymerization in an aqueous medium, which comprises conducting polymerization while suspending a mixture of the polymerizable components (monomers and crosslinking agents) with diluent in the form of droplets in an aqueous medium, for example, water.

In one preferable method for preparing the anion exchange resin of the invention, a mixture of copolymerizable monomers comprising at least 4 weight % of a crosslinking agent and a specific organic diluent are suspended in water in the presence of a radical initiator to be polymerized, followed by removal of said specific diluent after polymerization from the resin particles formed. Said organic solvent is substantially insoluble in water and specific in that it can dissolve the polymerizable components used but does not react therewith, has affinity for a homopolymer of at least one of the polymerizable components and no affinity for a homopolymer of at least one of other polymerizable components. Alternatively, such an organic diluent can be used together with another organic diluent which is also substantially insoluble in water, can dissolve the polymerizable components used but does not react therewith, and has no affinity for said homopolymer for which the former diluent has affinity.

Typical examples of combinations of monomers, crosslinking agents and diluents are as follows:

I. When at least one monomer selected from the group of styrene, vinyl toluene, ethylvinyl benzene and other aromatic vinyl monomers are used together with divinyl benzene as crosslinking agent, the following diluents are recommendable:

(a) a mixed diluent comprising at least two selected from the group consisting of aromatic hydrocarbons such as benzene, toluene, xylene and ethylbenzene; halogenated hydrocarbons such as dichloroethane, chloroform and chlorobenzene; nitro compounds such as nitrobenzene; aliphatic hydrocarbons such as heptane; cyclic hydrocarbons such as cyclohexane; alcohols such as methyl alcohol and ethyl alcohol; ethers; and carboxylic acids, (b) at least one diluent selected from the group consisting of esters such as ethyl acetate, methyl propionate, methyl benzoate, dimethyl phthalate, dioctyl phthalate and ethyl adipate; ketones such as methyl ethyl ketone and cyclohexanone; alcohols such as benzyl alcohol and lauryl alcohol; nitriles; amides; and sulfones, and (c) a linear polymer such as polystyrene, polyvinyltoluene, polymethylacrylate, etc.

II. When at least one monomers selected from the group consting of N-vinylsuccinimide, vinylimidazole, vinylpyridine, methylvinyl pyridine, vinyl quinoline, divinyl pyridine and triallylisocyanurate are used together with divinyl benzene as crosslinking agent, the following diluents are recommendable:

(a) a mixed diluent comprising at least two selected from the group consisting of aliphatic and cycloaliphatic hydrocarbons such as hexane, heptane, nonane, decane and cyclohexane; ethers such as ethyl ether and anisol; alcohols such as methyl alcohol, ethyl alcohol and benzyl alcohol; nitro compounds such as nitromethane, nitroethane and nitrobenzene, (b) at least one of ester compounds and ketones, and (c) a linear polymer such as polyvinyl imidazole, polyvinyl pyridine, polystryrene, polymethylmethacrylate, etc.

The anion exchange resin particles of the invention can be suitably used for uranium technology, especially for separation of uranium isotopes. Namely, separation of uranium isotopes can effectively be conducted by chromatography through the anion exchange resin particles of the present invention. In particular, they can suitably be applied for a process for separation of uranium isotopes which comprises displacing at least one redox boundary formed between an absorption zone of uranium isotope mixture and a reducing agent or an oxidizing agent through the anion exchange resins while conducting redox reaction at said boundary thereby to concentrate at least one isotope in the region near said boundary.

According to one preferred embodiment of said process (process A), a uranium isotope solution containing U(VI) compounds is first fed to a development column packed with the anion exchange resin particles of the invention and then a reducing agent solution is fed to the column to reduce the uranium (VI) ions adsorbed on the resins to be eluted in the form of uranium (IV) ions. A boundary is thereby formed (hereinafter referred to as "reduction boundary") between the uranium adsorption zone and the reducing agent and displaced in the direction of the flow of the eluant (i.e. reducing agent solution). A solution of reduced uranium ion is recovered as effluent from the end of the column and the uranium solution recovered from the vicinity of the reduction boundary is concentrated in uranium-235.

As a modification of said embodiment (process B), a solution of oxidizing agent is fed to the column, followed by feeding of a uranium isotope solution containing U(IV) compounds and then feeding of a reducing agent solution. In addition to the reduction boundary, another boundary is thereby formed (hereinafter referred to as oxidation boundary) between the oxidizing agent and the uranium adsorption zone forwardly in the direction of the eluant flow. The uranium solution recovered from the vicinity of the oxidation boundary is depleted in uranium-235 and the solution recovered from the vicinity of the reduction boundary is concentrated in uranium-235. If the step of feeding a reducing agent solution is omitted in the process B (process C), only a uranium solution depleted in uranium-235 is recovered from the vicinity of the oxidation boundary. In the above operations, uranium atoms should be in anionic form. Uranium ion coordinated with no ligand is usually in cationic form. It is known to convert uranium cation to uranium anion with negatively charged ligands such as inorganic ions (e.g. F, Cl, Br, $NO_3$, SCN, CN, $SO_4$ etc.), monocarboxylic acids (e.g. formic acid, acetic acid, monochloroacetic acid, dichloroacetic acid, etc.), dicarboxylic acids (e.g. oxalic acid, malonic acid, maleic acid, phthalic acid, etc.), hydroxy acids (e.g. pycolic acid, $\beta$-hydroxypropionic acid, lactic acid, hydroxysuccinic acid, tartaric acid, citric acid, sulfosalicyclic acid, etc.) amino acid (e.g. glycine, alanine $\beta$-alanine, aspartic acid, glutamic acid, etc.), aminopolycarboxylic acids (e.g. nitrolotriacetic acid, ethylenediaminetetraacetic acid (EDTA), 1,2-cyclohexanediaminetetraacetic acid, etc.), and the water soluble salts (e.g. sodium, potassium and ammonium salts of these acids).

In this invention, these ligands can also be used to convert uranium cation to uranium anion.

Another requirement in the above operation is that the rate of oxidation and reduction should be sufficiently large so that the oxidation boundary and reduction boundary can be narrow no matter how large is the linear velocity of the development. The rate of oxidation and reduction can be increased by use of a suitable reducing agent and oxidizing agent. The reducing agent suitable for the process of the invention includes titanium compounds (e.g. titanous chloride, titanous sulfate), vanadium compounds (e.g., vanadium chloride, vanadous sulfate), chromium compounds (e.g. chromous chloride, chromous sulfate, chromous acetate), molybdenum compounds (e.g. molybdenum (III) chloride), stannous compounds (e.g. stannous chloride and stannous hydroxide), cuprous compounds (e.g. cuprous chloride, cuprous carbonate, cuprous cyanide and cuprous potassium cyanide ($K_3Cu(CN)_4$)), organic compounds (e.g. formic acid, oxalic acid, and their sodium, potassium and ammonium salts), etc. The suitable oxidizing agent includes cerium compounds (e.g. ceric sulfate, ceric chloride), iron compounds (e.g. ferric chloride, ferric sulfate), ferricyano compounds (e.g. potassium ferricyanate, sodium ferricyanate), acids (e.g. chromic acid, dichromic acid, permanganic acid, metavanadic acid, tetravanadic acid and molybdic acid), oxo-acids (e.g. hypochlorous acid, chlorous chloric acid, perchloric acid, bromic acid, iodic acid and nitric acid), and salts of these acids (e.g., sodium, potassium or ammonium salts).

The solvents used for preparation of solutions of oxidizing agents, reducing agents and uranium compounds are water, other polar liquids and mixtures thereof. If desired, oil-miscible liquid can also be added.

The chromatography is usually conducted under conditions that the temperature is from 5° to 280° C., the pressure is from atmopheric pressure to 80 Kg/cm² and the linear velocity of boundary displacement is from 5 cm/day to 80 m/day.

In the present invention, measurements of D, $W_A$ and $V_B$ as mentioned above are performed by the following methods.

I. Measurement of D;

The parameter D is determined by measurement of the half time of ion exchange and is calculated by the following equation which is described in "Ion Exchange" (written by Friedrich Helfferich, published by McGraw-Hill Book Company, Inc. (1962))

$$D = 0.0075 \frac{d_p^2}{t_{\frac{1}{2}}} \text{ (cm}^2\text{/sec)}$$

wherein $d_p$ is particle diameter of resin (cm) and $t_{\frac{1}{2}}$ is half time of ion exchange (sec.)

The method of measurement of half time is also described in Sec 609, p. 309 of the above literature.

II. Measurement of $W_A$

The parameter $W_A$ is determined by measurement of void volume W of discrete micro-voids and the average size A of said micro-voids by the following equation:

$$W_A = W/10\sqrt{A}$$

The values of W and A are measured with a mercury penetration porosimeter (Model 910, produced by Micromeritics Instrument Corporation, Atlanta NE Freeway, 800 Goshen Spring Road Norcross, Georgia, 30071, U.S.A.) according to the method as described in "Fine Particle Measurement" (by Clyde Orr J. and J. M. Dalla valle, The Macmillan Company, New York, 1959).

III. Measurement of $V_B$

The parameter $V_B$ is determined by measurements of the whole void volume V in the resin and volume change of the resin B when equilibrated with 2 N HCl at 60° C. by the following equation:

$$V_B = V \times 5\sqrt{B}$$

The whole void volume V is determined by the following equation:

$$V = 1 - \frac{a}{d(1-e)}$$

wherein $a$ is apparent specific gravity of dried resin, $d$ is true specific gravity of dried resin and $e$ is the ratio of external void volume.

The true specific gravity $d$ is measured by the method of helium feeding, wherein the resin to be measured is fed in unit volume to a vessel and helium gas is fed under atmospheric pressure to said vessel. The true volume of dried resin is determined by the difference between the volume of helium gas fed to the vessel and the whole volume of the vessel and $d$ is calculated by dividing the weight of dried resin by the true volume thus determined.

The ratio of external void volume $e$ is measured by the well known method as described in Journal Chem. Eng. Progr., 43, P 713(1947) by Leva, M. and Crummer, M. (by extrapolation to $D_s/D=0$).

The apparent specific gravity $a$ is measured by conventional method in ion exchange industry, but the diameter of cylinder used is required to be more than one hundred times as large as that of dried resin particle.

The change of volume B is determined by the equation:

$$B = \frac{C_1 - C_0}{C_0} \times 100$$

wherein $C_0$ is the volume of dried resin particle and $C_1$ is that of the resin particle which is equilibrated with 2 N-hydrochloric acid at 60° C.

EXAMPLE 1

Various anion exchange resin particles are prepared according to the methods as described below.

Preparation A

An aqueous solution is prepared by dissolving under agitation 2.9 g of methylcellulose and 41 g of sodium chloride in 2000 g of water in a four-necked, 4 liter flask. Then, in this solution is suspended in fine droplets under stirring a mixture comprising 166 g of styrene and 14 g of ethylvinylbenzene as monomers, 20 g of divinylbenzene as crosslinking agent, 140 g of toluene, 30 g of n-butanol and 30 g of stearyl alcohol as mixed diluent and 2 g of azobisisobutyronitrile as radical initiator. The polymerization is conducted at 70° C. for 60 hours. The polymerized product is cooled and transferred to a washing tower equipped with a filter, wherein the resin particles obtained are washed fully with 10 liters of methanol and 100 liters of water, followed by drying at 40° C. for 50 hours under reduced pressure of 10 mmHg. The dried resin (150 g) is fed to a 2 liter reactor and is allowed to react with one liter of chloromethylether and 250 g of zinc chloride at 5° C. for 48 hours and then aminated with 15% aqueous dimethylamine solution. The ion exchange capacity of the thus prepared resin is found to be 4.45 meq./g(Cl⁻ form). This resin is numbered as "001".

Preparation B

Three different anion exchange resin particles are prepared in the same manner as in Preparation A except that 126 g of styrene and 14 g of ethylvinylbenzene are used as monomers, 60 g of divinylbenzene as crosslinking agent and various compounds as shown in Table 1 as diluents.

Table 1

| Resin No. | Diluents | Anion exchange capacity(meq/g) |
|---|---|---|
| 002 | 300 g of sec-butanol-30 g of butylstearate | 4.20 |
| 003 | 240 g of methylethylketone-160 g of n-butanol | 4.08 |
| 004 | 360 g of cyclohexanol-40 g of n-butanol | 3.97 |

Preparation C

Into an aqueous solution prepared by dissolving under agitation 2.5 g of methylcellulose, 1.2 g of gelatin, 12 g of sodium chloride and 15 g of sodium pyrophosphate in 2000 g of water in a four-necked, 4 liter flask is suspended under stirring in the form of droplets a mixture comprising 20 g of styrene, 16 g of ethylvinylbenzene and 144 g of 2-vinylpyridine as monomers, 20 grams of divinylbenzene as crosslinking agent, a diluent having 20 g of poly-2-vinylpyridine dissolved in 180 g of diethylphthalate and 4.3 g of azobisisobutyronitrile as radical initiator. Polymerization is carried out at 70° C. for 60 hours. The product is transferred to a washing tower equipped with a filter, washed fully with 20 liters benzyl alcohol, 20 liters of methanol and 200 liters of water. The ion exchange capacity of the resin obtained is found to be 4.89 meq/g. (Resin Number "005")

Preparation D

A mixture comprising 130 g of 4-vinylpyridine, 10 grams of 2-methyl-5-vinylpyridine and 10 g of ethylvinylbenzene as monomers, 5 g of divinylpyridine and 45 g of divinylbenzene as crosslinking agent, materials shown in Table 2 as diluents and 3.6 g of azobisisobutyronitrile as radical initiator is suspended in droplets in an aqueous solution having 35 g of methylcellulose dissolved in 2000 g of water in a four-necked, 4-liter flask. The polymerized product is washed fully with methanol and excessive water in a washing tower. The ion exchange capacity and Resin Number is also shown in Table 2.

Table 2

| Resin No. | Diluent (g) | | | | Anion exchange capacity (meq/g) |
|---|---|---|---|---|---|
| 006 | Cyclohexanone | (300) | | | 4.87 |
| 007 | Benzonitrile | (300) | | | 4.57 |
| 008 | Cyclohexanone | (240) | diethyl-phthalate | (60) | 4.76 |
| 009 | " | (210) | " | (90) | 4.94 |
| 010 | " | (180) | " | (120) | 4.54 |
| 011 | benzylalcohol | (100) | dibutyl-phthalate | (150) | 4.38 |
| 012 | nitroethane | (75) | diethyl-phthalate | (175) | 4.67 |
| 013 | nitroethane | (50) | " | (200) | 4.88 |
| 014 | cyclohexanol | (100) | dibutyl-phthalate | (150) | 4.72 |
| 015 | cyclohexanone | (40) | diethyl-phthalate | (160) | 4.41 |
| 016 | diethyl-phthalate | (200) | | | 4.59 |
| 017 | " | (180) | dibutyl-phthalate | (20) | 4.38 |

Preparation E

Preparation A is repeated, but the reagent of amination is trimethylamine (Resin Number 018) and the reagent of amination is diethanolamine (Resin Number 019).

Preparation F

Control samples

For comparative purpose, the resins are prepared by the same method as described in Preparation B except that materials shown in Table 3 are used as diluents.

Table 3

| Resin Number | Diluent (g) | Anion exchange capacity(meq/g) |
|---|---|---|
| 101 | Toluene (30) | 4.95 |
| 102 | Dioctylphthalate (40)-n-Butylalcohol (10) | 4.69 |
| 103 | n-butylalcohol (30) | 3.21 |
| 104 | iso-octanol (50) | 3.49 |

Reference samples

Four anion exchange resins which are on the market are used for reference. Resin Number, and Companies which manufacture these resins are as follows.

Table 4

| Resin Number | | |
|---|---|---|
| 201 | Dowex 1*8 | Dow Chemical Co. |
| 202 | Dowex 11 | " |
| 203 | Dowex 2*8 | " |
| 204 | Amberlite IRA-68 | Room & Haas Co. |

Each of the resin particles prepared in Preparation A and F, Control samples and Reference samples are conditioned in 2N-hydrochloric acid. The diameter of resins ($d_p$), anion exchange capacity (EC), the diameter of discrete pore (A), the self-diffusion coefficient (D), parameter ($W_A$) and parameter ($V_B$) are measured and the results are given in Table 5.

Tble 5

| Resin No. | P (microns) | E (meq/g) | A (angstrom) | D (cm$^2$/sec) | $W_A$ | $V_B$ |
|---|---|---|---|---|---|---|
| 001 | 171 | 4.45 | 280 | .78×10$^{-6}$ | .24 | .48 |
| 002 | 163 | 4.20 | 320 | .69 " | .32 | .97 |
| 003 | 173 | 4.08 | 2,480 | .96 " | .49 | 1.32 |
| 004 | 169 | 3.97 | 6,330 | .55 " | .50 | 1.36 |
| 005 | 112 | 4.89 | 4,200 | 1.28 " | .23 | .47 |
| 006 | 148 | 4.87 | none | .37 " | — | 1.62 |
| 007 | 137 | 4.59 | none | .55 " | — | 1.63 |
| 008 | 144 | 4.76 | 58 | 1.58 " | .59 | 1.64 |
| 009 | 154 | 4.94 | 108 | 3.45 " | .59 | 1.66 |
| 010 | 132 | 4.54 | 264 | 3.39 " | .74 | 1.68 |
| 011 | 122 | 4.38 | 588 | 5.85 " | .63 | 1.46 |
| 012 | 125 | 4.67 | 1,257 | 4.68 " | .53 | 1.45 |
| 013 | 127 | 4.88 | 3,004 | 5.88 " | .83 | 1.47 |
| 014 | 142 | 4.72 | 4,550 | 8.99 " | .83 | 1.48 |
| 015 | 139 | 4.41 | 5,020 | 3.37 " | .41 | 1.20 |
| 016 | 142 | 4.59 | 8,740 | 3.59 " | .45 | 1.19 |
| 017 | 149 | 4.38 | 9,880 | 2.88 " | .89 | 1.22 |
| 018 | 171 | 3.28 | 280 | .37 " | .25 | .46 |
| 019 | 171 | 3.41 | 280 | 1.15 " | .23 | .47 |
| 101 | 159 | 4.95 | none | 1.47×10$^{-8}$ | — | .22 |
| 102 | 148 | 4.69 | 470 | 5.38 " | .11 | .44 |
| 103 | 103 | 3.21 | 7,810 | 2.22 " | .08 | .26 |
| 104 | 117 | 3.49 | 11,300 | 487 " | .16 | .40 |
| 201 | 189 | 3.51 | none | 7.84×10$^{-9}$ | — | .10 |
| 202 | 121 | 4.02 | none | 4.42 " | — | .12 |
| 203 | 138 | 3.63 | none | 9.39 " | — | .28 |
| 204 | 197 | 5.61 | none | 1.48 " | — | .30 |

EXAMPLE 2

Twenty-seven cylindrical development columns, each being 8 mm in diameter, 1,000 mm in length and equipped with filter and jacket are packed with 49 ml of resins as prepared in Example 1, respectively. Each column is conditioned by passing 3.2 N hydrochloric acid through the development column and then 0.2 M Fe (III) in 3.2 N hydrochloric acid solution is passed therethrough to adsorb the oxidizing agent on the resin. Subsequently, 0.09 M uranous solution in 3.2 N hydrochloric acid is fed to the column and allowed to flow through the column while forming an oxidation boundary. After 167 ml of the uranous solution is fed, 0.08 M Ti (III) and 1.5 M Fe(II) in 3.2 N hydrochloric acid is charged to the column to displace the uranium adsorption zone while forming a reduction boundary. The effluents from the column are recovered in fractions of each 1.0 ml, and those from the vicinity of both boundaries are analyzed with mass spectrometer. The original content of uranium-235 in the feed is 0.007252. The results are given in Table 6.

Table 6

| Resin | Content of uranium-235 from the vicinity of oxidation boundary | Content of uranium-235 from the vicinity of reduction boundary |
| --- | --- | --- |
| 001 | .006829 | .007699 |
| 002 | .006644 | .007968 |
| 003 | .006563 | .008017 |
| 004 | .006626 | .007923 |
| 005 | .006749 | .007791 |
| 006 | .006686 | .007884 |
| 007 | .006858 | .007920 |
| 008 | .006620 | .007945 |
| 009 | .006406 | .008215 |
| 010 | .006314 | .008298 |
| 011 | .006462 | .008165 |
| 012 | .006277 | .008370 |
| 013 | .006145 | .008570 |
| 014 | .006437 | .008138 |
| 015 | .006092 | .008633 |
| 016 | .006404 | .008240 |
| 017 | .006464 | .007983 |
| 018 | .006750 | .007820 |
| 019 | .006525 | .008103 |
| 101 | .007139 | .007364 |
| 102 | .007120 | .007388 |
| 103 | .007129 | .007376 |
| 104 | .007155 | .007350 |
| 201 | .007234 | .007272 |
| 202 | .007241 | .007266 |
| 203 | .007226 | .007280 |
| 204 | .007182 | .007321 |

EXAMPLE 3

Twenty-seven cylindrical-divelopment columns, each being 10 mm in diameter, 1000 mm in length and equipped with filter are packed with 60 ml of the resins prepared in Example 1, Preparation A and B, respectively. A solution (solution-I) comprising 0.1 M citric acid, 900 parts of water, 100 parts of acetic acid with 0.1 M proton concentration is passed through each column for conditioning the resin. Then, another solution (Solution-II) which is prepared by dissolving 0.2 M uranyl in Solution-I is fed to each column to adsorb uranyl on the resin. Subsequently, a solution prepared by dissolving 0.05 M Ti (III), 1.2 M Fe (II) and 0.1 M citric acid in Solution-I is passed from the top of each column and developed while forming reduction boundary. The effluents are recovered in fractions of each 1.5 ml and those from the vicinity of the reduction boundary are measured with mass spectrometer to give the results as shown in Table 7. The original content of uranium-235 in the feed is 0.007250.

Table 7

| Resin Number | Content of uranium-235 from the vicinity of reduction boundary |
| --- | --- |
| 001 | .007484 |
| 002 | .007581 |
| 003 | .007672 |
| 004 | .007560 |
| 005 | .007510 |
| 006 | .007542 |
| 007 | .007565 |
| 008 | .007596 |
| 009 | .007700 |
| 010 | .007787 |
| 011 | .007693 |
| 012 | .007798 |
| 013 | .007940 |
| 014 | .007676 |
| 015 | .007883 |
| 016 | .007693 |
| 017 | .007620 |
| 018 | .007498 |
| 019 | .007715 |
| 101 | .007321 |
| 102 | .007313 |
| 103 | .007305 |
| 104 | .007275 |
| 201 | .007267 |
| 202 | .007261 |
| 203 | .0072744 |
| 204 | .007320 |

What we claim is:

1. In a process for separation of uranium isotopes by displacing at least one redox boundary formed between an adsorption zone of uranium isotope mixture and a reducing agent or an oxidizing agent through a system of anion exchanger while conducting a redox reaction at said boundary thereby to concentrate at least one isotope in the region near said boundary, the improvement which comprises using as anion exchange an anion exchanger particle with a size of 1 mm or less in diameter compris- a three-dimensionally crosslinked polymer containing functional groups having anion exchange capacity of 0.2 milliequivalents or more per gram of dry resin and having a self-diffusion coefficient of uranyl ion of at least $1 \times 10^{-7}$ cm$^2$/sec.

2. A process for separation of uranium isotopes as claimed in claim 1, wherein a uranium isotope solution containing U(VI) compounds is first fed to a development column packed with the anion exchange resin particle and then a reducing agent solution is fed to the column to reduce the uranium (VI) ions adsorbed on the resin particles to be eluted in the form of uranium (IV) ions, thereby forming a boundary between the uranium adsorption zone and the reducing agent which is displaced in the direction of the flow of said reducing agent, to concentrate uranium-235 in the vicinity of said boundary.

3. A process for separation of uranium isotopes as claimed in claim 1 wherein a solution of oxidizing agent is first fed to a development column packed with the anion exchange resin particles, followed by feeding of a uranium isotope solution containing U(IV) compounds and then by feeding of a reducing agent solution, thereby forming a boundary between the oxidizing agent and the uranium adsorption zone and another boundary between the reducing agent and the uranium adsorption zone, to concentrate uranium-235 in the vicinity of the latter boundary and uranium-238 in the vicinity of the former.

4. A process for separation of uranium isotopes as claimed in claim 1, wherein a solution of oxidizing agent is first fed to a development column packed with the anion exchange resin particles, followed by feeding of a uranium isotope solution thereby forming a boundary between the oxidizing agent and the uranium adsorption zone, to concentrate uranium-238 in the vicinity of the boundary.

5. A process as claimed in claim 1, wherein the particle contains discrete micro-voids having sizes in the range from 40 to 9000 angstroms.

6. A process as claimed in claim 5, wherein the particle is of a specific structure as expressed by the parameters $W_A$, which is the ratio of void volume of the discrete microvoids divided by the tenth root of the size thereof, and $V_B$, which is the ratio of whole void volume in the resin particle multiplied by the fifth root of percentage of volume change of the resin particle when equilibrated with 2 N HCl to 60° C., said $W_A$ being in the range from 0.2 to 1 and $V_B$ in the range from 0.2 to 3.

7. A process as claimed in claim 6, wherein $W_A$ is in the range from 0.4 to 0.9 and $V_B$ in the range from 0.4 to 2.

8. A process as claimed n claim 1, wherein functional groups having anion exchange capacity are tertiary amino groups.

9. A process as claimed in claim 8, wherein the anion exchange particle is one selected from the group consisting of (a) chloromethylated and aminated product of a crosslinked polymer made by addition polymerization of styrene, vinyl toluene or ethylvinyl benzene with divinyl benzene, (b) aminated product of a cross-linked polymer made by addition polymerization of chloromethyl styrene, methylvinyl ketone, epoxybutadiene or acrylamide with divinyl benzene or triallylcyanurate, (c) a crosslinked polymer made by copolymerization of N-vinyl succinimide, N-vinyl phthalimide, vinyl carbazole, vinyl imidazole, vinyl pyridine, vinyl tetrazole, vinyl quinoline, divinyl pyridine with divinyl benzene, and (d) crosslinked polycondensates made by condensation of polyethyleneimine, or hexamethylenediamine with dichloroethane orepichlorohydrin.

* * * * *